Oct. 6, 1953     O. A. HANSEN     2,654,686
STIFFENED HONEYCOMB CORE
Filed May 11, 1950     3 Sheets-Sheet 1

INVENTOR:
Otto A. Hansen
BY Herbert E. Metcalf
HIS PATENT ATTORNEY

Oct. 6, 1953  O. A. HANSEN  2,654,686
STIFFENED HONEYCOMB CORE
Filed May 11, 1950  3 Sheets-Sheet 2

INVENTOR
Otto A. Hansen
BY Herbert E. Metcalf
HIS PATENT ATTORNEY

Oct. 6, 1953

O. A. HANSEN 2,654,686

STIFFENED HONEYCOMB CORE

Filed May 11, 1950

INVENTOR:
Otto A. Hansen

BY Herbert E. Metcalf
HIS PATENT ATTORNEY

Patented Oct. 6, 1953

2,654,686

UNITED STATES PATENT OFFICE 2,654,686

STIFFENED HONEYCOMB CORE

Otto A. Hansen, Venice, Calif., assignor to Northrop Aircraft, Inc., Hawthorne, Calif., a corporation of California Application May 11, 1950, Serial No. 161,430

1 Claim. (Cl. 154—45.9)

My invention relates to honeycomb cores, or the like, used for incorporation in honeycomb core sandwiches. Such sandwiches have a low weight-to-strength ratio, and are widely used in the aircraft industry.

Most honeycomb cores, as presently used in industry, are formed from relatively thin corrugated sheets of metal, fiber, paper, plastic, and the like, with each corrugation the size and shape of one-half a cell. A plurality of sheets are then bonded together, usually with a thermosetting adhesive, to form a core having a plurality of six-sided cells. The exposed edges of the cells are then applied to skin sheets by means of an adhesive to form a honeycomb core sandwich. The skin sheets may be of materials similar to the core sheets, may be thicker, or may be of metal, usually the latter. In airplane construction the skin sheets are usually of aluminum alloy. The net result is a relatively thick, light and strong structural member.

Considering the honeycomb core above, the term "thickness" (T) as used herein, is the dimension determining the depth of the cells in the core. Length (L) and width (W) are the dimensions of the core at right angles to themselves and to the thickness dimension.

The honeycomb core, made as above described, is, of course, very stiff in the thickness dimension. However, this type of construction is quite flexible in response to forces applied in line with the length and width directions and will contract or expand as such forces are applied, in accordance with the direction of force application. Consequently, to stiffen the cores along their length and width dimensions, the skin sheets must be relied upon in the completed sandwiches.

There are many instances, however, when it is desirable to have the cores themselves stiff along all dimensions, and it is an object of the present invention to provide a means and method of stiffening a honeycomb core along the length and width thereof, without the use of skin sheets.

Due to the peculiar flexing characteristics of honeycomb cores, it is difficult to bend the core along the length thereof without causing the core to automatically bend in width. Similarly, bending along the width causes the core to bend in length also. Furthermore, unless the thickness of the core is less than about one and one-half times the average cell diameter, the undesired bend is almost impossible to remove with pressures less than those causing damage to the core. In consequence, when honeycomb sandwiches, curved either in length or width only, are desired, whose thickness is greater than several times the cell diameter, it is necessary to bandsaw the curved core out of a much thicker core, thereby wasting a large amount of core material in the trim. As honeycomb cores suitable for aircraft use cost, at the time of filing the present application, about $85.00 a cubic foot, it can readily be seen that curved honeycomb cores of the type described are very costly, due to trim wastage in forming the curved core. Also, it is difficult to bandsaw cores to accurate dimensions.

It is an object of the present invention to provide a means and method of forming a honeycomb core curved in either length or width only, without the use of skin sheets and without wastage of core material.

It is another object of the invention to provide a honeycomb core stiff in all three dimensions, both straight and with curved sections.

I have found that when honeycomb cores are less in thickness than about one and one-half times the average cell diameter, they can be curved in width or length only, the natural curvature occurring in the other dimension being readily overcome by pressure. When, therefore, two or more such relatively thin cores are curved either in length or width only, they can be superimposed while curved and then bonded, while the correct curve is being maintained by pressure, to each other through an intermediate sheet of material, which in many cases can be merely a piece of kraft paper having adhesive on both sides thereof. After setting of the adhesive has been accomplished, the pressure is removed and a stable, stiff curved core is obtained which, of course, can be made as thick as desired by the use of as many thin cores as may be needed. A similar process, applied to flat cores, will produce a flat core exceptionally stiff in all directions.

Having described my invention broadly above, I will now described a preferred embodiment of the invention in more detail by reference to the appended drawing in which.

Figure 1:
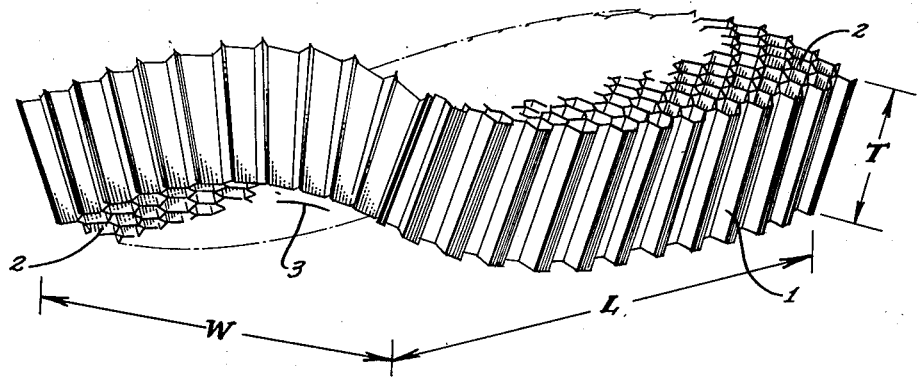
Figure 1 is a perspective view of a honeycomb core showing a typical double curvature in length and width.

In the drawings the relative thickness of the stiffening sheets has been greatly exaggerated for clarity of illustration.

Referring first to Figure 1, a honeycomb core 1 is shown in perspective. This core has been placed, by means not shown, under stresses bending the core along the length L of the core. The thickness T of the core is in this case several times the average diameter of the individual core cells 2. As a result of the bending along the length L, an automatic bend 3 is made along the width W. If, for example, a honeycomb sandwich is to be made in which the finished sandwich is to have only the curve along the length L, then the curve 3 along the width W must be flattened by pressure when the skin sheets are applied to the core. This procedure is objectionable because high pressure equipment would have to be used, and because flattening of the curve along width W is liable to tear the core apart. Furthermore, when attempts are made to bend cores two or three times as thick as the core shown in Figure 1, it will be found the cores do not bend readily in either the width or length dimensions. Consequently, it is the general practice in industry to bandsaw curved cores out of blocks of core material. Apart from the expense of this process, the cores readily change their length and width dimensions under stress. Thus, even bandsawed curved cores are difficult to make in any close relation to desired dimensions.

Figure 2:
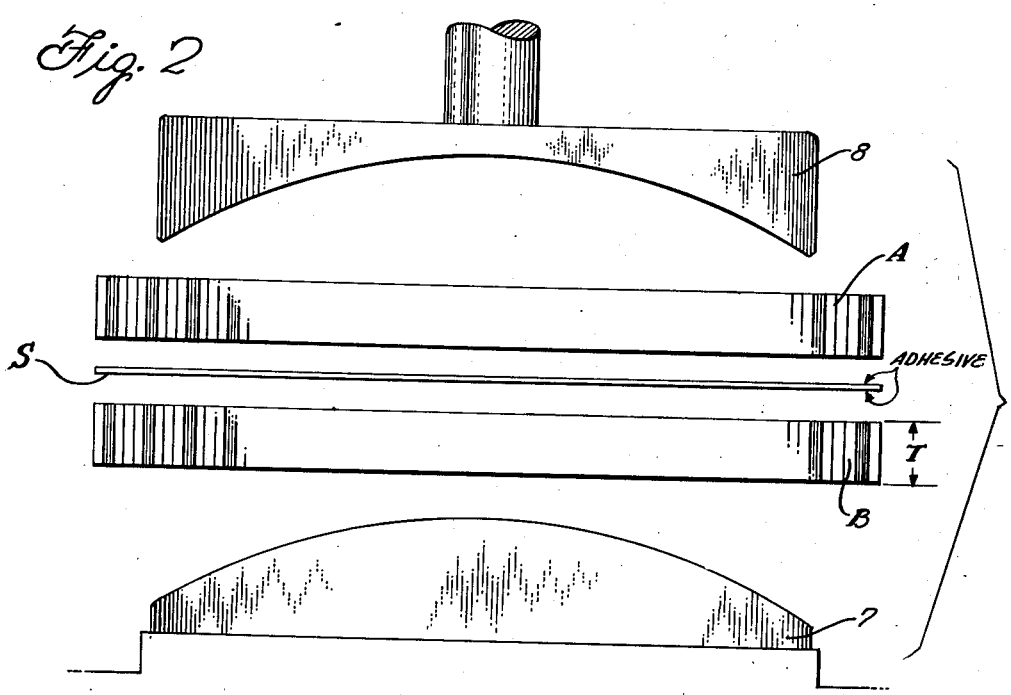
Figure 2 is a schematic elevation view showing the method of forming a stable honeycomb core curved in one dimension only at right angles to the extent of the core cells.

A honeycomb core curved in length or width only can be made as shown in Figure 2 in accordance with the teachings of the present invention. Here, two flat core sections A and B, whose thickness T is less than about one and one-half the cell diameter of the core sections, are superimposed with a thin stiffening sheet S, such as kraft paper, between the core sections A and B. The stiffening sheet S is covered on both sides thereof with a time-setting adhesive, such as for example, one of the thermo-setting plastic adhesives. The two sections A and B are then placed between male and female dies 7 and 8, respectively, having the curvature desired. The dies are then applied to the sections to force them into the desired curve with the stiffening sheet therebetween. This curvature can be accomplished because the core sections A and B are sufficiently thin to enable the dies 7 and 8 to readily press out the undesired curve without undue pressure and without damage to the core sections. Pressure is maintained with both core sections in contact with the stiffening sheet S while heat is applied to cause the adhesive to set. Pressure is then removed and the composite core 10 removed from the die.

Figure 3:
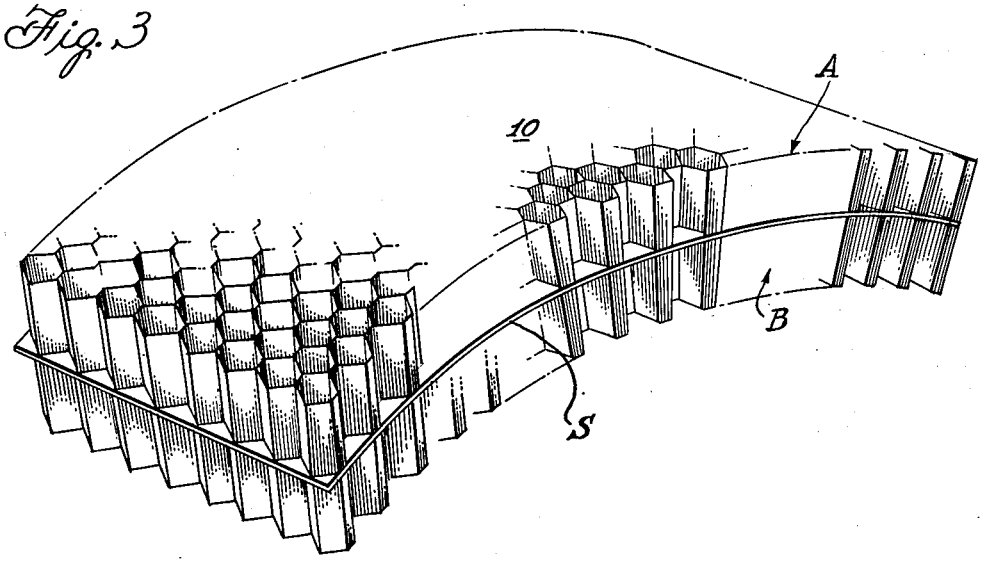
Figure 3 is a perspective view of a completed curved honeycomb core.

The removed composite core 10 is shown in Figure 3 as being curved in length but not in width. The composite core 10, when removed from the dies after the sections have been joined through the intermediate stiffening sheet S, has substantially no springback and is in stable stress equilibrium, with no tendency to return to the original flat condition. This is because the cells of the lower sheet at the convex side in contact with the stiffening sheet were extended in the direction of the curvature when the curve was made, and tend to return to their original form. The cells of the upper sheet at the concave side in contact with the stiffening sheet were narrowed in the direction of curvature when the curve was made, and these cells tend to return to their original shape, all as shown in somewhat exaggerated form in the intermediate portion of the core structure shown in Figure 3. As the cell distortion, due to curvature, is substantially equal and opposite at the stiffening sheet, all forces tending to cause springback are locally equalized throughout the extent of the stiffening sheet through the medium of this stiffening sheet. Thus, the composite curved core 10 is stable, and, furthermore, is stiffened in length and width by the stiffening sheet.

In forming composite cores, as above described, no attempt need be made to match cell sections at the stiffening sheet. Even if cells should be matched in one portion of the composite core, they would not remain matched, due to the opposite distortion of the cell sections at the stiffening sheet.

While I have illustrated the core of Figure 3 as formed from only two core sections, it is similarly possible to make curved cores using more than two sections, as desired.

Figure 4:
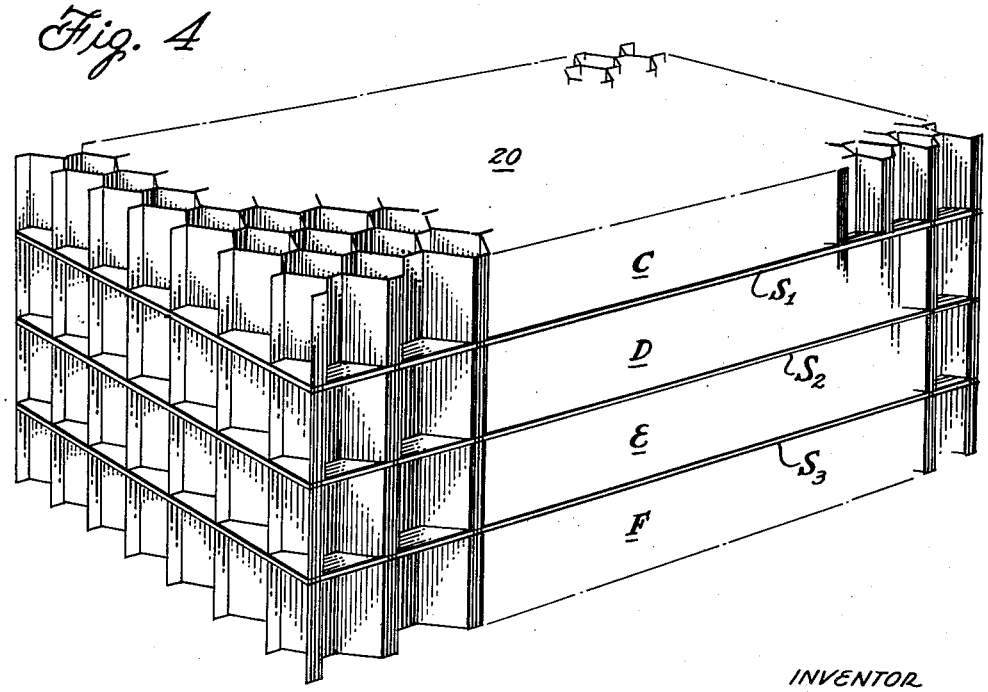
Figure 4 is a perspective view of a relatively thick flat honeycomb core stiffened in accordance with the present invention.

In Figure 4 I have shown a flat composite core 20 formed from four sections C, D, E and F bonded to three intermediate stiffening sheets $S_1$, $S_2$ and $S_3$. This core, due to the boxed cell construction is completely stiff in all dimensions. Cells can be matched, if desired, in this construction.

Figure 5:
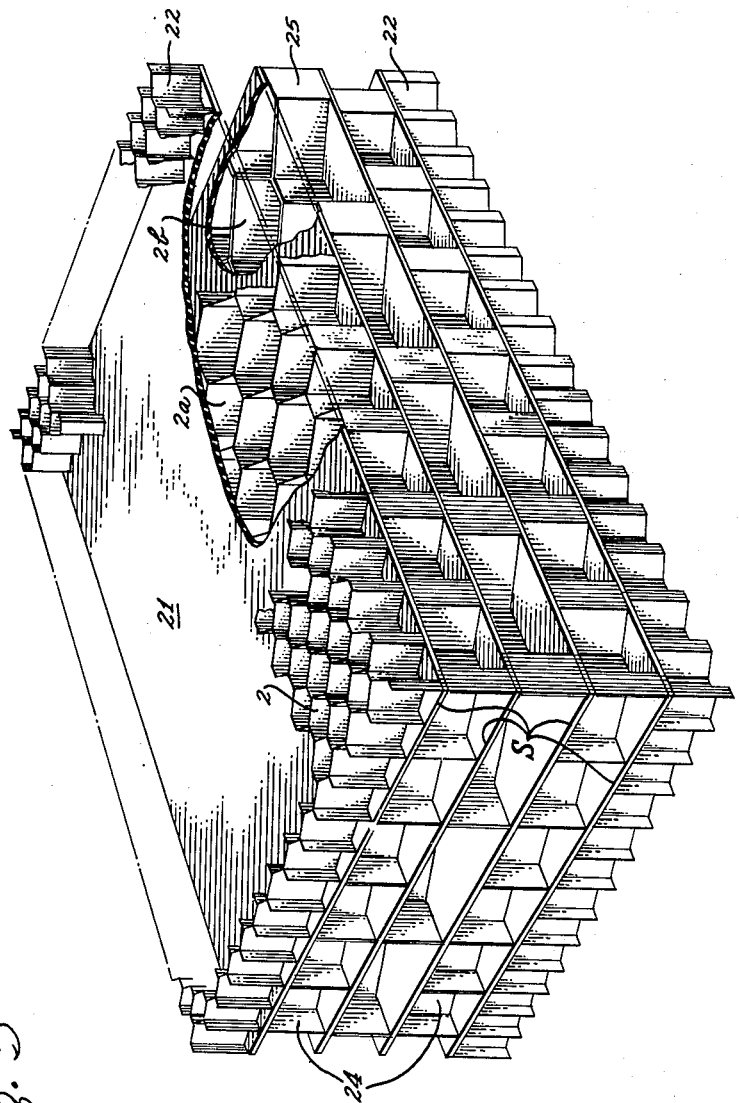
Figure 5 is a perspective view of a honeycomb core structure showing a lightened construction made possible by the present invention.

In Figure 5, another composite core 21 comprises two outside sections 22 having honeycomb cells 2 with a relatively small diameter (one-fourth inch, for example), two intermediate sections 24 with cells $2a$ having a diameter of about twice that of the cells of the outside sections 22, and a center section 25 with cells $2b$ having a correspondingly greater diameter. These sections are bonded and stiffened by the same type of thin sheets S used in the other figures. By using the various relatively large diameter cell material, the resultant core is obviously much lighter in weight than a core using a plurality of sections having equal small diameter cells. This composite core 21 can also be made in curved form, using the method previously described.

It is to be noted that the composite cores of the present invention are stiffened, either in curved or flat form, without interference with the outside cell edges to be bonded to the skin sheets, so that after fabrication the composite cores can be made into sandwiches as desired.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute, the invention has been described in language more or less specific as to structural features, it is to be understood that the invention is not limited to the specific features shown, but that the means and construction herein disclosed comprise the preferred form of several modes of putting the invention into effect, and the invention is, therefore, claimed in any of its forms or modifications within the legitimate and valid scope of the appended claim.

What is claimed is:

A stable curved honeycomb core structure curved at right angles to the extent of the honeycomb cells, which comprises at least two normally flat honeycomb core sections each having a thickness not substantially greater than about one and one half times the average diameter of its cells, said core sections being superimposed in the direction of the extent of said cells, and an intermediate stiffening sheet between each pair of adjacent core sections, the adjacent cell ends between each of said pairs being bonded to said stiffening sheet, the cells of each said section being widened at the convex face thereof in the direction of curvature of said core structure and narrowed at the concave face thereof in said direction, whereby all internal forces tending to flatten said core structure are locally equalized at and by said stiffening sheet.

OTTO A. HANSEN.

References Cited in the file of this patent

UNITED STATES PATENTS

| Number | Name | Date |
|---|---|---|
| 1,389,294 | Dean | Aug. 30, 1921 |
| 1,924,472 | Thomson | Aug. 29, 1933 |
| 2,001,632 | Schlichting | May 14, 1935 |
| 2,407,867 | Buchanan | Sept. 17, 1946 |
| 2,414,125 | Rheinfrank | Jan. 14, 1947 |
| 2,422,998 | Adams et al. | June 24, 1947 |
| 2,423,870 | Blessing | July 15, 1947 |
| 2,501,180 | Kunz | Mar. 21, 1950 |
| 2,556,470 | Delmar | June 12, 1951 |

FOREIGN PATENTS

| Number | Country | Date |
|---|---|---|
| 578,603 | Great Britain | July 4, 1946 |
| 613,529 | Great Britain | Nov. 30, 1948 |

OTHER REFERENCES

"Honeycomb Core in Sandwich Structure," article by Leonard S. Meyer et al., published in "Modern Plastics" for July 1945, page 136.

Lincoln article in "Modern Plastics" for May 1946, vol. 23, No. 9, pp. 127–129.

Honeycomb Sandwich Construction by G. May in "Plastics" (London), October 1949, pp. 64–66.